(12) United States Patent
Chander et al.

(10) Patent No.: US 10,540,599 B2
(45) Date of Patent: Jan. 21, 2020

(54) BEHAVIOR PREDICTION

(71) Applicant: FUJITSU LIMITED, Kawasaki-shi, Kanagawa (JP)

(72) Inventors: Ajay Chander, San Francisco, CA (US); Ramya Malur Srinivasan, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 720 days.

(21) Appl. No.: 15/093,662

(22) Filed: Apr. 7, 2016

(65) Prior Publication Data
US 2017/0293853 A1    Oct. 12, 2017

(51) Int. Cl.
*G06F 17/30* (2006.01)
*G06N 7/00* (2006.01)
*G06F 3/0481* (2013.01)
*G06F 17/27* (2006.01)

(52) U.S. Cl.
CPC .......... *G06N 7/005* (2013.01); *G06F 3/0481* (2013.01); *G06F 17/2765* (2013.01)

(58) Field of Classification Search
USPC ....... 707/607, 609, 687, 705, 718, 790, 813, 707/821
See application file for complete search history.

(56) References Cited

U.S. PATENT DOCUMENTS

| | | | | |
|---|---|---|---|---|
| 8,428,948 B1 * | 4/2013 | Roizen | .................. | G06F 17/277 704/251 |
| 8,944,958 B1 | 2/2015 | Brumback et al. | | |
| 9,017,221 B2 | 4/2015 | Brumback et al. | | |
| 9,104,718 B1 * | 8/2015 | Levy | .................. | G06Q 30/0631 |
| 2013/0216989 A1 | 8/2013 | Cuthbert | | |
| 2014/0099614 A1 | 4/2014 | Hu et al. | | |
| 2014/0379744 A1 * | 12/2014 | Kuo | ....................... | G06F 3/0237 707/767 |
| 2015/0100512 A1 * | 4/2015 | Mishra | ................. | G06Q 50/205 705/326 |
| 2015/0193651 A1 * | 7/2015 | Gleim | ................. | G06K 9/00295 382/118 |

OTHER PUBLICATIONS

European Search Report for corresponding application No. 17 15 0734 dated Apr. 11, 2017.
J Bobadilla et.al., "Recommender Systems Survey," Knowledge-Based Systems, vol. 46, Jul. 2013, pp. 109-132.

* cited by examiner

*Primary Examiner* — Sana A Al-Hashemi
(74) *Attorney, Agent, or Firm* — Maschoff Brennan

(57) ABSTRACT

A method may include extracting feature information from a user history including multiple goal messages. Each of the multiple goal messages may include visual media and text, and may be associated with a goal indicated as completed. Extracting the feature information from the user history may include performing feature detection on the visual media of the multiple goal messages. The feature information from the user history may be analyzed for correlations between features and the completion indications of the associated goals. Feature information may be extracted from a generic goal message. A probability of a user indicating completion of a goal associated with the generic goal message may be determined based at least in part on the feature information from the generic goal message and the correlations between the features included in the multiple goal messages and the indications of the associated goals having been completed.

20 Claims, 5 Drawing Sheets

BEHAVIOR PREDICTION

FIELD

The embodiments discussed herein are related to behavior prediction.

BACKGROUND

Conventional behavior tracking and behavior modification systems may track and report a user's biometric data and activities. Biometric sensors may include step counters, heart rate monitors, and the like. Tracked activities may include walking, running, sleeping, and the like. In some systems, a user may set a goal, such as to walk for 5 miles within a given length of time, and the system may track and display the user's progress towards completing the goal. Some systems may further display messages regarding progress towards and/or completion of the goal.

In some systems, a first goal may be made to depend from a second goal. For instance, a threshold of the first goal may be increased in response to completing the second goal or completing a threshold portion of the second goal. Alternately or additionally, some systems may attempt to identify and influence user habits. For example, some systems may collect data for a period of time, identify a habit from the collected data, and classify the identified habit. During another period of time, the systems may determine whether the user has deviated from the classified habit. The systems may further attempt to prompt a change in behavior by the user based on the collected data.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include extracting feature information from a user history including multiple goal messages. Each of the multiple goal messages may include visual media and text, and may be associated with a goal indicated as completed. Extracting the feature information from the user history may include performing feature detection on the visual media of the multiple goal messages. The feature information from the user history may be analyzed for correlations between features and the completion indications of the associated goals. Feature information may be extracted from a generic goal message. A probability of a user indicating completion of a goal associated with the generic goal message may be determined based at least in part on the feature information from the generic goal message and the correlations between the features included in the multiple goal messages and the indications of the associated goals having been completed.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claimed subject matter.

BRIEF DESCRIPTION OF THE DRAWINGS

Example embodiments will be described and explained with additional specificity and detail through the use of the accompanying drawings.

DESCRIPTION OF EMBODIMENTS

Conventional behavior tracking and behavior modification systems may operate from an assumption that a user may modify behaviors and achieve goals in response to simply being made aware of biometric, behavior, and/or habit data and patterns. Encouraging behavior modification and goal achievement via such a mechanic and/or based on such an assumption may be relatively inefficient.

Embodiments of the present disclosure may encourage behavior modification and goal achievement with a relative increase in efficiency over conventional systems and methods. Thus for example, some embodiments may offer improvements in behavior tracking and modification technologies, and/or behavior prediction technologies. Some embodiments may include systems and methods for predicting behaviors of a user and/or personalizing interactions with the user to encourage the user to perform a desired action. For example, a user may be given a particular goal message through a goal delivery and tracking system. In some embodiments, a goal management system of the goal delivery and tracking system may determine a probability of the user completing the goal associated with a proposed goal message. For example, the goal management system may employ a prediction module to determine a probability of the user completing the goal. In some embodiments, the probability may be determined based on features of the goal message and on features of the proposed goal messages for which the user has previously completed associated goals. Additionally, the probability may be based in part on features of goal messages for which the user has previously failed associated goals. In some embodiments, the goal management system may personalize features of the proposed goal message to increase the probability of the user completing the goal.

Example embodiments may be explained with reference to the accompanying drawings.

Figure 1:
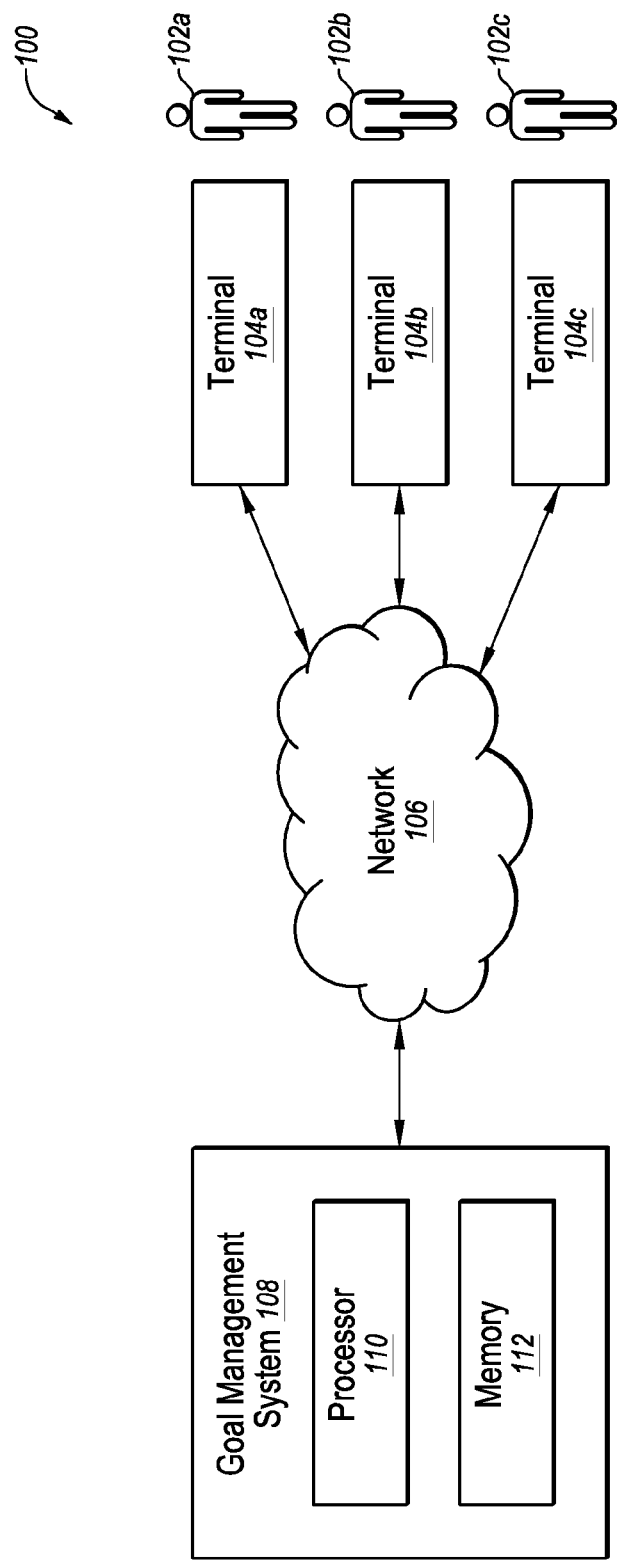
FIG. 1 is a diagram of an example goal delivery and tracking system.

FIG. 1 is a diagram of an example goal delivery and tracking system 100. The system 100 may include multiple users. For example, the system 100 may include a user 102a, a user 102b, and a user 102c (collectively "users 102"), and additional users. Each of the users may be associated with a terminal. For example, the users 102 may be respectively associated with a terminal 104a, a terminal 104b, and a terminal 104c (collectively "terminals 104").

The terminals 104 may be capable of communicating with and via a network 106, outputting a message, and/or receiving input from a user. For example, the terminals 104 may include a computing device, such as a smartwatch, fitness tracking device, smartglasses, smartphone, desktop computer, laptop computer, tablet computer, smart TV, or the like or any combination thereof. The network 106 may include the internet, a radio-access network, a wide area network, a local area network, a personal area network, or the like or any combination thereof.

The system 100 may include a goal management system 108 capable of communicating with the terminals 104 via the network 106. The goal management system 108 may include a processor 110 and memory 112. The memory 112 may include a non-transitory computer-readable medium having encoded therein programming code executable by the processor 110 to perform operations, such as the operations and methods disclosed herein.

In some embodiments, the goal management system 108 may be configured to deliver goal messages to the terminals 104 and to receive indications from the terminals 104 that goals associated with the goal messages were and/or were not completed.

Figure 2:
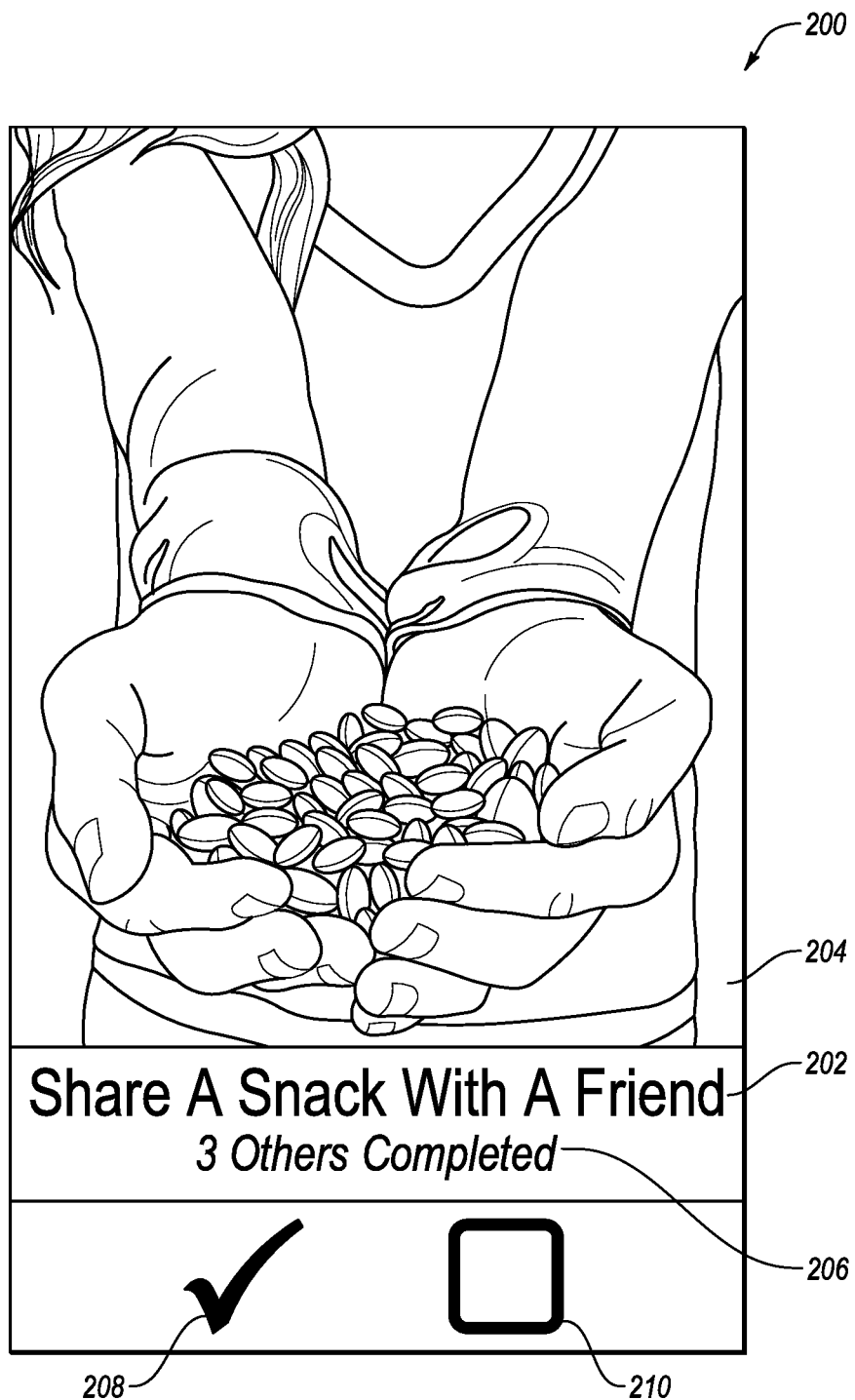
FIG. 2 illustrates an example goal message.

FIG. 2 illustrates an example goal message 200. The goal message 200 may be delivered to one or more users via terminals, which may generally correspond, respectively, to the terminals 104 and the users 102 of FIG. 1. For example, the goal message 200 may be displayed on displays of the terminals 104. Alternately or additionally, the goal message 200 may include audio media, video media, haptic communication, or the like for output via the terminals 104. In some embodiments, the goal message 200 may be described symbolically. For instance, the goal message 200 may be described to the user as a "One" or the like.

In some embodiments, the goal message 200 may include text 202. The text 202 may describe a goal that an associated user may attempt to complete. The goal may be described as a microgoal, which may include a relatively simple goal and/or a goal that may be achievable in a relatively short period of time. Alternatively, the goal may be relatively complex and/or may be achievable over a relatively long period of time. In some embodiments, the goal message may be associated with an expiration time, such as 24 hours, after which the goal message 200 may be replaced by a new goal message.

By way of example, the goal may be "share a snack with a friend" as shown in FIG. 2, "get more sleep," "drink more water today," "go for a walk today," "recall a good birthday memory," "remember your favorite family vacation," "exercise for 30 minutes today," or the like. Alternately or additionally, the goal may relate to relatively longer-term goals or themes, which may optionally be selected by the associated user. By way of example, themes may include "body," "mind," "exercise," "sleep," "nutrition," "community," or the like or any combination thereof.

Alternately or additionally, the goal message 200 may include media 204. The media 204 may include an image, audio, a video, haptic sensation, or the like. The media 204 may be related to the goal indicated by the text 202. In some embodiments, including media 204 related to the goal indicated by the text 202 may increase the likelihood that a user completes the goal. By way of example, the media 204 may include an image of a person with a snack-like food when the goal is described as "share a snack with a friend" by the text 202. Alternatively, the media 204 may be unrelated to the goal indicated by the text 202.

In some embodiments, the goal message 200 may include a complete button 208 and/or a photo button 210. A user may select the complete button 208 to indicate that the goal described by the text 202 was successfully completed. The user may select the photo button 210 to activate a camera of a terminal for taking a picture indicating that the goal was completed. The picture may be uploaded to the goal management system to confirm the goal was completed. In some embodiments, selecting neither the complete button 208 nor the photo button 210 before the goal message 200 expires may indicate that the goal described by the text 202 was not successfully completed. Alternately or additionally, the user may indicate that the goal described by the text 202 was not successfully completed.

Receiving an indication that a goal has been completed may be used as proxy for goal completion, as it may not consistently be confirmed that a goal has actually been completed. As described herein, determining a probability that a user will complete a goal may include a probability that the user will select the complete button 208 or otherwise indicate that a goal was successfully completed without actually having completed the goal.

Alternately or additionally, where an associated terminal may determine and/or confirm whether the goal has been met through sensors in the terminal or sensors in a connected device, the terminal may automatically indicate that that goal described by the text 202 was successfully completed. For example, if the text 202 reads, "visit a park today," the terminal may monitor a global positioning system (GPS) sensor or another location-identifying sensor and may indicate the goal has been completed in response to the terminal determining that it is located within the boundaries of a park.

The goal message 200 may further include an indicator of social completions 206. The social completions 206 may seemingly represent, from the perspective of a user, a number of people using an associated goal management system, in a user's social network, in an area relatively local to the user, in a particular community, and/or the like who have completed or otherwise approved of the same goal. However, in some embodiments, the goal message 200 may perform in a manner contrary to the user's expectations and may alter the number of social completions 206 shown to the user. For example, the number of social completions 206 shown to the user may be altered to increase a probability that the user completes the goal. Examples of altering the number of social completions 206 shown to the user may be described below.

In some embodiments, the social completions 206 may be represented symbolically. For example, the social completions 206 may be represented as people "hearting," "loving," or "liking" the goal message 200. The social completions 206 may indicate whether the user has indicated completion of the goal associated with the current goal message 200 or an equivalent goal message previously delivered to the user. For example, the social completions 206 may state, "you and 3 others completed this goal," "you and 12 others loved this One," "you and 4 others liked this," or the like.

Figure 3:
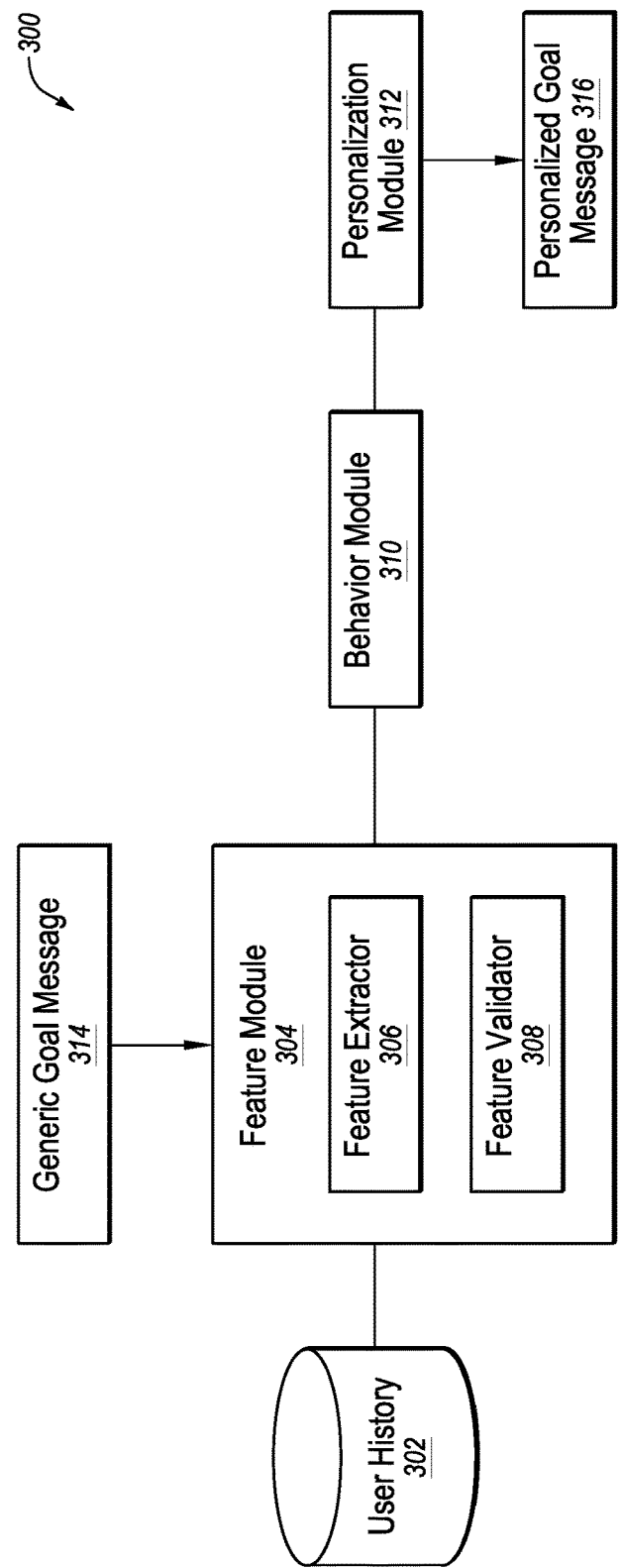
FIG. 3 is a diagram of an example goal management system.

FIG. 3 is a diagram of an example goal management system 300. The goal management system 300 may generally correspond to the goal management system 108 of FIG. 1. The goal management system 300 may include a user history 302. The user history 302 may include a record of goal messages, which may generally correspond to the goal message 200 of FIG. 2, previously delivered to each user. The user history 302 may further include a record of the delivered goal messages indicated as completed.

The goal management system 300 may further include a feature module 304. The feature module 304 may include a feature extractor 306 and/or a feature validator 308. The feature module 304 may receive user history data from the user history 302, such as data identifying user goal completions, user goal failures associated goal messages, user preferences, or the like or any combination thereof. Alternately or additionally, the feature module 304 may receive a generic goal message 314.

The feature extractor 306 may analyze the goal messages from the user history 302, the generic goal message 314, and/or the user data from the user history 302. In some embodiments, the feature extractor 306 may analyze media of the goal messages, which may generally correspond to the media 204 of the goal message 200 of FIG. 2. For example, the feature extractor 306 may perform feature detection on visual media, such as images and/or video, of the goal messages via computer vision technology or the like. The feature extractor 306 may identify visual features such as human faces and/or emotions shown on the human faces, emotions of a scene of the visual media, colors, textures, landmarks, objects, plants, animals, foods, or the like or any combination thereof.

Alternately or additionally, the feature extractor 306 may analyze text of the goal message, which may generally correspond to the text 202 of the goal message 200 of FIG. 2. For example, the feature extractor 306 may perform sentiment analysis and/or other text analysis to identify themes of the text, the presence and number of positive words, or the like. By way of example, the feature extractor 306 may associate the text with one or more themes of "body," "mind," "growth," "nature," and/or "community" and/or may classify words and/or phrases of the text as positive.

In some embodiments, the feature extractor 306 may analyze the goal messages from the user history 302 for user features. For example, the feature extractor 306 may determine a total number of goals completed by the user, a total number of goal messages delivered to the user, or the like. Alternately or additionally, the feature extractor 306 may identify theme preferences of the user based on the relative proportions of themes represented by the completed goals and/or failed goals. Alternately or additionally, the feature extractor 306 may identify theme preferences selected by the user, which may be included in the user history 302 and retrieved with the goal messages.

The feature validator 308 of the feature module 304 may determine whether the features extracted by the feature extractor 306 may be employed as predictors of a user successfully completing a particular goal associated with a particular goal message. For example, the feature validator 308 may attempt to identify a correlation between the extracted features, which may be described as proposed predictors, and goal completion for the user.

By way of example, the feature validator 308 may attempt to establish a correlation between themes associated with the goals and the probability of the user completing the goal. Put another way, if the user is relatively more likely to complete goals associated with a goal message having a particular theme, then the theme associated with a goal message may be used as a predictor for estimating a probability of the user completing the associated goal.

In some embodiments, the feature validator 308 may construct a distribution of completions from a user according to the formula $P(u,v)$, which may represent a probability of a user, represented by u, completing a goal associated with a particular theme, represented by v. Thus, for example, $P(u,v)$ may equal completions$(u,v)$/completions$(u,V)$, which may represent a number of goal completions associated with the theme for the user divided by a number of goal completions associated with the set of all themes in the system, which may be represented by V, for the user.

Optionally, the feature validator 308 may estimate a completion distribution across all users. For example, the feature validator 308 may average $P(u,v)$ across all users to obtain an appropriate probability distribution, which may be represented by the equation $P(U)\_v = (1/V)\Sigma P(u,v)$, where the summation may be across all users, represented by U.

Alternately or additionally, the feature validator 308 may attempt to determine whether a distribution of completions for a proposed predictor may be fit by a uniform distribution. For example, if a completion distribution for a proposed predictor may be fit by a uniform distribution, the proposed predictor may not represent a good predictor for determining probabilities that users will complete associated goals. Put another way, if a completion distribution for a proposed predictor may be fit by a uniform distribution, a correlation may not exist between the proposed predictor and a probability of completing an associated goal.

In some embodiments, the feature validator 308 may attempt to determine whether a distribution of completions for a proposed predictor may be fit by a uniform distribution by plotting the kurtosis of the distribution against the square of the skewness of the observation. The position of the plot may be examined with respect to various standard distributions, such as Beta, uniform, Weibull, lognormal, exponential, normal, logistic, and gamma distributions, or the like. A Kolmogorov-Smirov (K-S) goodness of fit test or other goodness of fit test may be employed to determine whether the chosen distribution fitting the observations may be valid.

Alternately or additionally, the feature validator 308 may perform a chi-square test for testing the null hypothesis that a proposed predictor and completions are independent. For example, the feature validator 308 may apply a Pearson's chi-square test on a set of a proposed predictor and a set of goal completions. A rejection of the null hypothesis may indicate dependency between the proposed predictor and completions. Thus, for example, a rejection of the null hypothesis may encourage use of the proposed predictor to determine a probability that a user may complete an associated goal.

Although described above with reference to themes, the feature validator 308 may attempt to establish a correlation between other features extracted by the feature extractor 306 and the probability of the user completing the goal. For example, the feature validator 308 may attempt to establish a correlation between a probability of the user completing a goal and the presence of particular media types, positive text, text themes, human faces and/or emotions shown on the human faces, landmarks, objects, plants, animals, foods, colors, textures, sounds, haptic sensations, numbers of social completions, or the like included in a goal message. Establishing a correlation may include establishing a negative correlation between features and the probability of the user completing the goal. For example, a user may have a fear of dogs and the presence of dogs and/or dog-related features in goal message media may discourage the user from completing the associated goal.

In some embodiments, the feature extractor 306 may cease extraction of features identified by the feature validator 308 as relatively poor predictors of goal completions for a particular user, a group of users, and/or the full set of users.

The goal management system 300 may include a behavior module 310. The behavior module 310 may receive feature information from the feature module 304. For example, the behavior module 310 may receive predictor information and/or other information identifying features of goal messages that may be used to estimate a probability of a user successfully completing a goal associated with a particular goal message. Alternately or additionally, the behavior module 310 may receive information identifying features present in the generic goal message 314.

In some embodiments, the behavior module 310 may receive a feature code associated with features of the generic goal message 314 extracted by the feature module 304, the predictors and/or features of the goal messages from the user history 302 extracted by the feature extractor 306, user features, or the like or any combination thereof. By way of example, the feature code may identify a number of words associated with a positive sentiment in a goal message text, which may correspond to the text 202 of the goal message 200 of FIG. 2. Alternately or additionally, the feature code may identify one or more themes of the message text. For example, the feature code may include a unique number associating the text with one or more of the themes "body," "mind," "growth," "nature," and/or "community." Alternately or additionally, the feature code may identify a number of people in in a user's social network, in an area relatively local to the user, in a particular community, and/or the like who have completed or otherwise approved of the same goal, which may correspond to the social completions 206 of the goal message 200 of FIG. 2. Optionally, the feature code may identify a number of goals completed by the user.

In some embodiments, the feature code may identify long-term goals or themes selected by and/or preferred by the user. For example, the feature code may include a unique number associated with a particular combination of the themes "body," "mind," "exercise," "sleep," "nutrition," and/or "community." Alternately or additionally, the feature code may identify whether a human face is present in and/or the number of human faces included in goal message media, which may correspond to the media 204 of the goal message 200 of FIG. 2. Optionally, the feature code may identify emotions conveyed by the one or more human faces in the goal message media. For example, the feature code may include a unique number associated with facial emotions of "joy," "calmness," "excitement," "contentment," "satisfaction," or the like or any combination thereof.

The feature code may alternately or additionally identify other information regarding the features of the generic goal message 314 extracted by the feature module 304, features of the goal messages from the user history 302 extracted by the feature module, user information, or the like or any combination thereof. By way of example, the feature code may identify any information extracted by the feature extractor 306 of the feature module 304. For example, the feature code may identify other elements included in goal message media, such as colors, textures, animals, foods, activities, sports, landmarks, or the like or any combination thereof.

In some embodiments, the behavior module 310 may determine a probability that a user will complete a goal associated with a particular goal message based on received and/or determined model parameters, predictor values, predictor weights, and/or bias values. For example, the behavior module 310 may receive and/or determine predictor values for a particular goal message, such as the generic goal message 314, which may be represented by the predictor vector $x=[x\_1, x\_2, \ldots x\_f]$, where f may represent a number of predictor features. Alternately or additionally, the behavior module 310 may receive and/or determine weights associated with the predictor values for a particular user, and may be represented by the weight vector $w=[w\_1, w\_2, \ldots w\_f]$.

Using the predictor and weight vectors, a probability of a user completing a goal associated with a particular goal message, which may be represented by p, may be determined based on the following logistic function.

$$p=1/(1+e^{-\vec{w}^T\vec{x}}) \qquad \text{Eq. 1}$$

In some embodiments, the goal management system 300 may include a personalization module 312. The personalization module 312 may deliver a personalized goal message 316 equivalent to the generic goal message 314 to a user if the probability of the user completing the generic goal message 314 is at or above a probability threshold. Alternately, if the probability of the user completing the generic goal message 314 is below the probability threshold, the personalization module 312 may generate a personalized goal message 316 associated with a probability of completion at or above the probability threshold.

The personalized goal message 316 may be based on the generic goal message 314. In some embodiments, the personalization module 312 may revise one or more of the features of the generic goal message 314 to create the personalized goal message 316. For example, a new value may be found for x_1 of the predictor vector $x=[x\_1, x\_2, \ldots x\_f]$ that results in a probability p at or above the probability threshold. The new value for x_1 may be represented as x_1'.

In some embodiments, a value for x_1' may be determined according to the following equation.

$$x\_1'=-[S+\ln(1/p-1)]/w\_1 \qquad \text{Eq. 2}$$

Where $$S=\Sigma_{i=2}^{i=f}-w\_i*x\_i \qquad \text{Eq. 3}$$

Alternately or additionally, new values may be found for any of x_2 through x_f of the predictor vector x. New values may be associated with revisions to the generic goal message 314. By way of example, new values may be associated with adding positive words to a text of the generic goal message 314; changing the media of the generic goal message 314, such as to include more human faces, particular emotions, objects, landscapes, or the like; increasing a number of social completions of the generic goal message 314; or the like or any combination thereof.

For some features, x_1' may be constrained to have a value greater than 0 and a value greater than x_1. For example, a revised number of social completions, which may generally correspond to the social completions 206 of the goal message 200 of FIG. 2, may be constrained to be greater than 0 and greater than the number of social completions associated with the generic goal message 314 should the feature extractor 308 determine that an increase in social completions may correlate to an increased likelihood a user will complete an associated goal.

Using the number of social completions as an example, a generic goal message 314 may be associated with 4 social completions. The behavior module 310 may determine, via Equation 1, that the probability of a user completing the associated goal is below a threshold probability, which may be set at 0.7, or at some other probability. The personalization module 312 may determine, via Equations 2 and 3, that revising the generic goal message 314 to include 12 social completions may raise the probability of the user completing the associated goal to a value at or above the threshold probability. The personalization module 312 may deliver to the user a personalized goal message 316 including the features of the generic goal message 314, save for the social completions, of which there may be 12 in the personalized goal message 316 compared to 4 in the generic goal message 314. The personalized goal message 316 may be delivered to a device associated with the user, which may generally correspond to the terminals 104 of FIG. 1. In some embodiments, the user history 302, the feature module 304, the behavior module 310, and/or the personalization module 312 may together be described as a behavior predictor.

Figure 4:
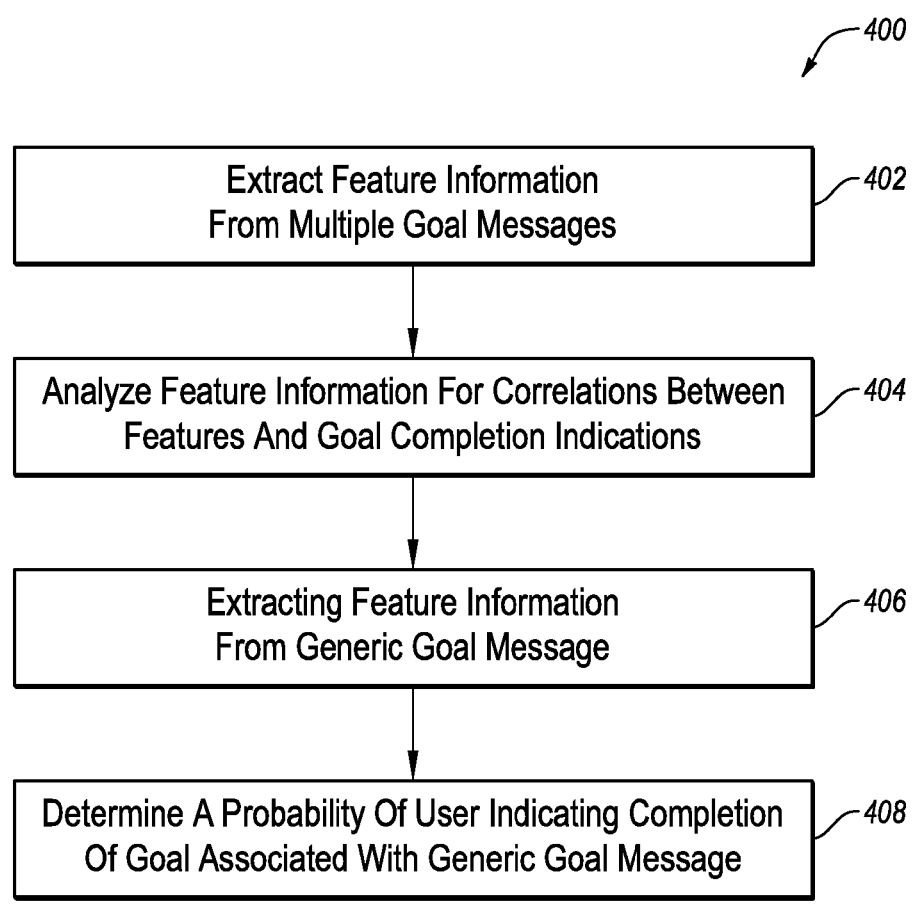
FIG. 4 is a flowchart of an example method.

FIG. 4 is a flowchart of an example method 400. The method 400 may be performed by a goal management system corresponding to the goal management system 108 of FIG. 1 and/or the goal management system 300 of FIG. 3. The method 400 may begin at block 402 by extracting feature information from a user history including multiple goal messages. Extracting the feature information from multiple goal messages may be performed by a feature extractor generally corresponding to the feature extractor 306 of the feature module 304 of FIG. 3. The user history may generally correspond to the user history 302 of FIG. 3 and/or the multiple goal messages may each generally correspond to the goal message 200 of FIG. 2. The multiple goal messages may each include visual media, text, and/or may each be associated with a goal indicated as completed. Extracting the feature information from the user history may include performing feature detection on the visual media of the multiple goal messages.

In some embodiments, performing the feature detection on the visual media of the multiple goal messages may further include detecting the presence of human faces. Optionally, emotions of the detected human faces may be further determined. Alternately or additionally, emotions of the visual media may be determined. In some embodiments, extracting the feature information from the user history may include identifying, via text analysis, positive words or phrases included in text of the multiple goal messages. Alternately or additionally, extracting the feature information from the user history may include identifying user features. By way of example, user features may include a total number of goals indicated as completed by the user and/or theme preferences of the user.

The method 400 may continue to block 404 by analyzing the feature information from the user history for correlations between features included in the multiple goal messages and indications of the associated goals having been completed. Analyzing the feature information from the user history for correlations between features included in the multiple goal messages and indications of the associated goals having been completed may be performed by a feature validator generally corresponding to the feature validator 308 of the feature module 304 of FIG. 3.

The method 400 may continue to block 406 by extracting feature information from a generic goal message. The generic goal message may generally correspond to the goal message 200 of FIG. 2. Extracting the feature information from the generic goal message may be performed by a feature extractor generally corresponding to the feature extractor 306 of the feature module 304 of FIG. 3.

The method 400 may continue to block 408 by determining a probability of a user indicating completion of a goal associated with the generic goal message. The probability may be based at least in part on the feature information from the generic goal message and the correlations between the features included in the multiple goal messages and the indications of the associated goals having been completed. The probability may be determined by a behavior module generally corresponding to the behavior module 310 of FIG. 3.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

For example, in some embodiments, the method 400 may further include, in response to the probability of the user indicating completion of the goal associated with the generic goal message being below a probability threshold, generating a personalized goal message based on the generic goal message including one or more revised features. The personalized goal message may be generated by a personalization module generally corresponding to the personalization module 312 of FIG. 3. The personalized goal message may be delivered to a device associated with the user. The device associated with the user may generally correspond to the terminals 104 of FIG. 1. The one or more revised features of the personalized goal message may be associated with an increase in the probability of the user indicating completion of the goal associated with the personalized goal message relative to the goal associated with the generic goal message.

Alternately or additionally, the method 400 may further include, in response to the probability of the user indicating completion of the goal associated with the generic goal message being at or above a probability threshold, delivering a personalized goal message equivalent to the generic goal message to a device associated with the user. The personalized goal message may generally correspond to the personalized goal message 316 and the generic goal message 314 may generally correspond to the generic goal message 314 of FIG. 3.

Although described with reference to goal message delivery and goal achievement, the systems and methods described herein may be applied to the completion of other events or actions by a user within a group of users. In some embodiments, the systems and methods described herein may be employed to understand and/or encourage financial behaviors. For example, the systems and methods described herein may be used for observing the effects and/or interdependencies of others' transaction rates, such as stock transaction rates, on transactions made by an individual. Alternately or additionally, the systems and methods described herein may be employed to influence individuals in a group to arrive at a consensus by suggesting how many of the others in the group have agreed to a particular solution.

Figure 5:
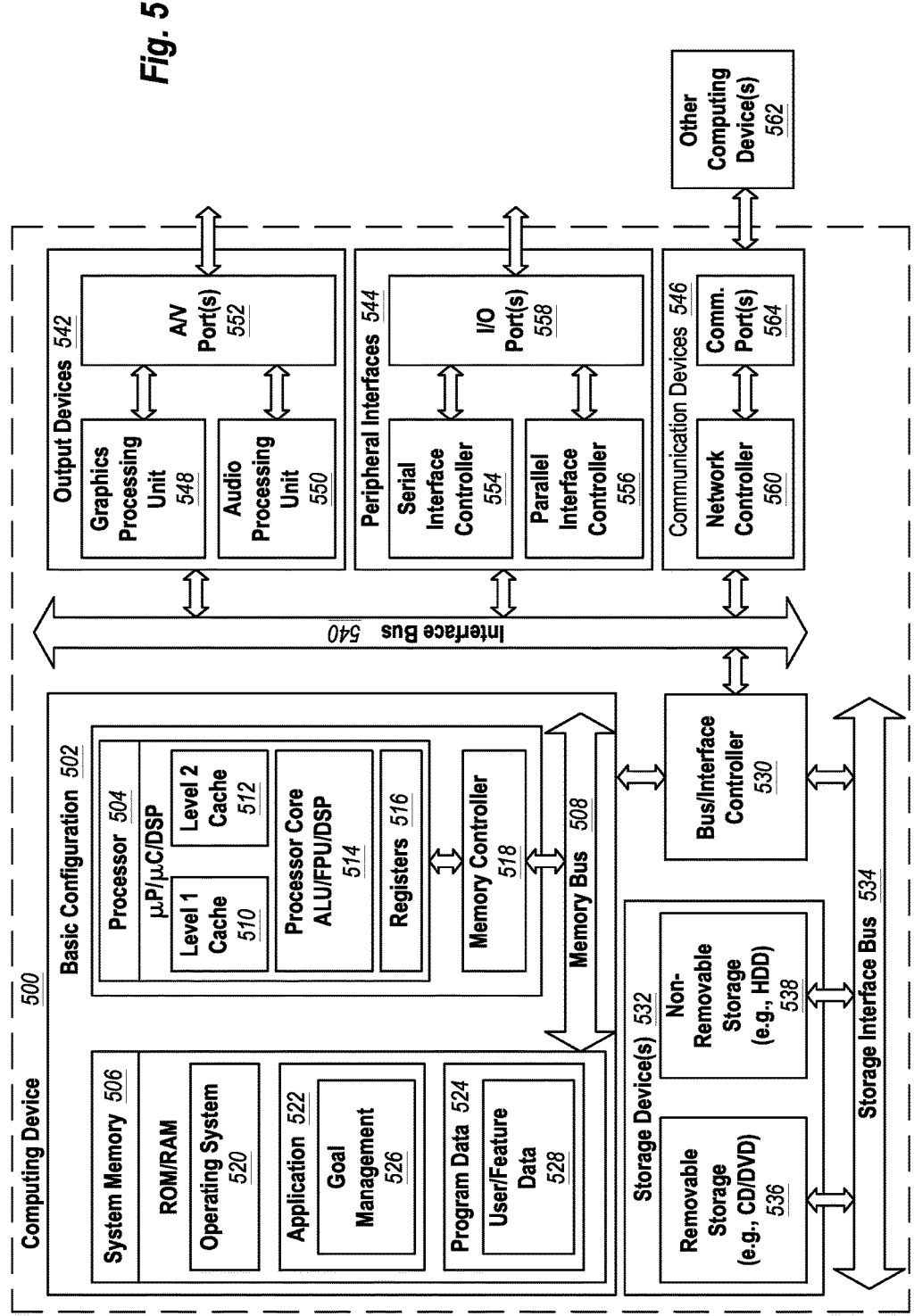
FIG. 5 is a block diagram illustrating an example computing device.

FIG. 5 is a block diagram illustrating an example computing device 500. The computing device may be arranged to predict behavior and/or encourage behavior modification in accordance with the present disclosure. The computing device 500 may be one example of an embodiment of the goal management system 108 of FIG. 1 and/or an embodiment of the goal management system 300 of FIG. 3. In a configuration 502, the computing device 500 typically includes one or more processors 504 and a system memory 506. The processor 504 and/or the memory 506 may generally correspond to the processor 110 and/or the memory 112 of the goal management system 108 of FIG. 1. A memory bus 508 may be used for communicating between the processor 504 and the system memory 506.

Depending on the desired configuration, the processor 504 may be of any type including but not limited to a microprocessor (µP), a microcontroller (µC), a digital signal processor (DSP), or any combination thereof. The processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory, such as Random Access Memory (RAM);

non-volatile memory, such as Read Only Memory (ROM), flash memory, etc.; or any combination thereof. The system memory 506 may include an operating system 520, one or more applications 522, and program data 524. The application 522 may include a goal management algorithm 526 that may be arranged to perform the functions as described herein including those described with respect to the goal management system 108 of FIG. 1, the goal management system 300 of FIG. 3, and the method 400 of FIG. 4. The program data 524 may include user/feature data 528 such as may be included in the user history 302 and/or extracted and/or validated by the feature module 304 of FIG. 3 and that may be useful for operation with the goal management algorithm 526 as is described herein. Alternately or additionally, the user/feature data 528 may include the generic goal message 314 and/or the personalized goal message 316 of FIG. 3. In some embodiments, the application 522 may be arranged to operate with the program data 524 on the operating system 520 such that behavior prediction and/or behavior modification encouragement may be provided as described herein.

The computing device 500 may have additional features or functionality, and additional interfaces to facilitate communications between the basic configuration 502 and other devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536, and the non-removable storage devices 538 are examples of computer storage media. Computer storage media includes, but is not limited to, RAM, ROM, Electronically Erasable and Programmable Read Only Memory (EEPROM), flash memory or other memory technology, Compact Disc-Read Only Memory (CD-ROM), digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more input/output (I/O) ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a small-form factor portable (or mobile) electronic device such as a cell phone, a tablet computer, a smartphone, a smartwatch, smart glasses, a personal data assistant (PDA), a personal media player device, a wireless web-watch device, a personal headset device, an application specific device, or a hybrid device that include any of the above functions. The computing device 500 may also be implemented as a personal computer including both laptop computer and non-laptop computer configurations.

As used herein, the terms "module" may refer to specific hardware implementations configured to perform the operations of the module and/or software objects or software routines that may be stored on and/or executed by the computing device 500. In some embodiments, the different components, modules, and services described herein may be implemented as a part of the application 522 and/or the goal management algorithm 526. For example, the feature module 304, the behavior module 310, and/or the personalization module 312 of FIG. 3 may be implemented by computer-executable instructions stored in the system memory 506 and executed by the processor 504. While some of the system and methods described herein are generally described as being implemented in software, specific hardware implementations or a combination of software and specific hardware implementations are also possible and contemplated.

All examples and conditional language recited herein are intended for pedagogical objects to aid the reader in understanding the embodiments and the concepts contributed by the inventor to furthering the art, and are to be construed as being without limitation to such specifically recited examples and conditions. Although embodiments have been described in detail, it should be understood that the various changes, substitutions, and alterations could be made hereto without departing from the scope of the embodiments.

What is claimed is:

1. A method comprising:
    obtaining a plurality of previous goal messages from a user history of a user, each respective previous goal message of the plurality of previous goal messages including previous visual presentation features that relate to how suggestion of performance of a respective action related to accomplishing a corresponding goal of the respective previous goal message is visually presented to the user for completion by the user, the visual presentation features including: text describing the respective action and visual media related to the respective action described by the corresponding text of the respective goal message;

obtaining, from the user history, a plurality of indications in which each respective indication of the plurality of indications is with respect to a corresponding one respective previous goal message of the plurality of previous goal messages, the respective indication indicating whether the respective action of its corresponding respective previous goal message was performed by the user;

extracting historical feature information related to the visual presentation features of the plurality of previous goal messages and completion of the respective actions of the previous goal messages, the extracting of the historical feature information being based on one or more of: the text of the plurality of previous goal messages, the visual media of the plurality of previous goal messages, and the plurality of indications;

analyzing the historical feature information and the plurality of indications to determine correlations between how the previous visual presentation features included in the plurality of previous goal messages relate to the indications of the performance of the respective actions of the plurality of previous goal messages;

extracting feature information from a generic goal message, the feature information relating to visual presentation features of the generic goal message that relate to how a suggested action of the generic goal message is visually presented to the user for completion by the user;

determining, based on the historical feature information and the feature information from the generic goal message, a visual relationship between how the previous visual presentation features relate to the visual presentation features of the generic goal message with respect to visual presentation of their respective actions; and determining a probability of the user indicating completion of the suggested action associated with the generic goal message based at least in part on the visual relationship and the determined correlations.

2. The method of claim 1, further comprising:

in response to the probability of the user indicating completion of the suggested action associated with the generic goal message being below a probability threshold, generating a personalized goal message based on the generic goal message including one or more revised features; and delivering the personalized goal message to a device associated with the user.

3. The method of claim 2, wherein the one or more revised features of the personalized goal message is associated with an increase in the probability of the user indicating completion of the suggested action associated with the personalized goal message relative to a goal associated with the generic goal message.

4. The method of claim 1, further comprising, in response to the probability of the user indicating completion of the suggested action associated with the generic goal message being at or above a probability threshold, delivering a personalized goal message equivalent to the generic goal message to a device associated with the user.

5. The method of claim 1, wherein:
the extracting of historical feature information includes detecting human faces; and
the determined correlations are based on expressions of the detected human faces.

6. The method of claim 1, wherein:
the extracting of historical feature information includes at least one of determining emotions of the previous visual presentation features and determining emotions of detected human faces; and
the determined correlations are based on at least one of the determined emotions of the visual media and the determined emotions of the detected human faces.

7. The method of claim 1, wherein the extracting of the historical feature information includes identifying positive words or phrases included in the text via text analysis.

8. The method of claim 1, wherein the extracting of the historical feature information includes identifying one or more user features of the user, the one or more user features including one or more of: a total number of goals indicated as completed by the user, and a theme preference of the user.

9. A non-transitory computer-readable medium having encoded therein programing code executable by a processor to perform operations comprising:

obtaining a plurality of previous goal messages from a user history of a user, each respective previous goal message of the plurality of previous goal messages including previous visual presentation features that relate to how suggestion of performance of a respective action related to accomplishing a corresponding goal of the respective previous goal message is visually presented to the user for completion by the user, the visual presentation features including: text describing the respective action and visual media related to the respective action described by the corresponding text of the respective goal message;

obtaining, from the user history, a plurality of indications in which each respective indication of the plurality of indications is with respect to a corresponding one respective previous goal message of the plurality of previous goal messages, the respective indication indicating whether the respective action of its corresponding respective previous goal message was performed by the user;

extracting historical feature information related to the visual presentation features of the plurality of previous goal messages and completion of the respective actions of the previous goal messages, the extracting of the historical feature information being based on one or more of: the text of the plurality of previous goal messages, the visual media of the plurality of previous goal messages, and the plurality of indications;

analyzing the historical feature information and the plurality of indications to determine correlations between how the previous visual presentation features included in the plurality of previous goal messages relate to the indications of the performance of the respective actions of the plurality of previous goal messages;

extracting feature information from a generic goal message, the feature information relating to visual presentation features of the generic goal message that relate to how a suggested action of the generic goal message is visually presented to the user for completion by the user;

determining, based on the historical feature information and the feature information from the generic goal message, a visual relationship between how the previous visual presentation features relate to the visual presentation features of the generic goal message with respect to visual presentation of their respective actions; and determining a probability of the user indicating completion of the suggested action associated with the generic goal message based at least in part on the visual relationship and the determined correlations.

10. The non-transitory computer-readable medium of claim 9, the operations further comprising:

in response to the probability of the user indicating completion of the suggested action associated with the generic goal message being below a probability threshold, generating a personalized goal message based on the generic goal message including one or more revised features; and delivering the personalized goal message to a device associated with the user.

11. The non-transitory computer-readable medium of claim 10, wherein the one or more revised features of the personalized goal message is associated with an increase in the probability of the user indicating completion of the suggested action associated with the personalized goal message relative to a goal associated with the generic goal message.

12. The non-transitory computer-readable medium of claim 9, the operations further comprising, in response to the probability of the user indicating completion of the suggested action associated with the generic goal message being at or above a probability threshold, delivering a personalized goal message equivalent to the generic goal message to a device associated with the user.

13. The non-transitory computer-readable medium of claim 9, wherein:

the extracting of historical feature information includes detecting human faces; and the determined correlations are based on expressions of the detected human faces.

14. The non-transitory computer-readable medium of claim 9, wherein:

the extracting of historical feature information includes at least one of determining emotions of the previous visual presentation features and determining emotions of detected human faces; and the determined correlations are based on at least one of the determined emotions of the visual media and the determined emotions of the detected human faces.

15. The non-transitory computer-readable medium of claim 9, wherein the extracting of the historical feature information includes identifying positive words or phrases included in the text via text analysis.

16. A system comprising:

one or more processors; and one or more computer-readable media having encoded therein programing code executable by the one or more processors, that, in response to being executed by the one or more processors, causes the system to perform operations comprising:

obtaining a plurality of previous goal messages from a user history of a user, each respective previous goal message of the plurality of previous goal messages including previous visual presentation features that relate to how suggestion of performance of a respective action related to accomplishing a corresponding goal of the respective previous goal message is visually presented to the user for completion by the user, the visual presentation features including: text describing the respective action and visual media related to the respective action described by the corresponding text of the respective goal message;

obtaining, from the user history, a plurality of indications in which each respective indication of the plurality of indications is with respect to a corresponding one respective previous goal message of the plurality of previous goal messages, the respective indication indicating whether the respective action of its corresponding respective previous goal message was performed by the user;

extracting historical feature information related to the visual presentation features of the plurality of previous goal messages and completion of the respective actions of the previous goal messages, the extracting of the historical feature information being based on one or more of: the text of the plurality of previous goal messages, the visual media of the plurality of previous goal messages, and the plurality of indications;

analyzing the historical feature information and the plurality of indications to determine correlations between how the previous visual presentation features included in the plurality of previous goal messages relate to the indications of the performance of the respective actions of the plurality of previous goal messages;

extracting feature information from a generic goal message, the feature information relating to visual presentation features of the generic goal message that relate to how a suggested action of the generic goal message is visually presented to the user for completion by the user;

determining, based on the historical feature information and the feature information from the generic goal message, a visual relationship between how the previous visual presentation features relate to the visual presentation features of the generic goal message with respect to visual presentation of their respective actions; and determining a probability of the user indicating completion of the suggested action associated with the generic goal message based at least in part on the visual relationship and the determined correlations.

17. The system of claim 16, wherein the operations further comprise:

in response to the probability of the user indicating completion of the suggested action associated with the generic goal message being below a probability threshold, generating a personalized message based on the generic goal message including one or more revised features and delivering the personalized message to a device associated with the user; and in response to the probability of the user indicating completion of the suggested action associated with the generic goal message being at or above the probability threshold, delivering a personalized message equivalent to the generic goal message to the device associated with the user.

18. The system of claim 16, wherein the extracting of historical feature information includes at least one of determining emotions of the visual media and determining emotions of detected human faces.

19. The system of claim 16, wherein the extracting of the historical feature information includes identifying positive words or phrases included in the text via text analysis.

20. The system of claim 16, wherein the extracting of the historical feature information includes identifying one or more user features of the user, the one or more user features including one or more of: a total number of goals indicated as completed by the user, and a theme preference of the user.

\* \* \* \* \*